United States Patent [19]

Johnson

[11] Patent Number: 5,035,602
[45] Date of Patent: Jul. 30, 1991

[54] RESIN TRANSFER MOLDING CORE AND PREFORM

[75] Inventor: Carl F. Johnson, Belleville, Mich.

[73] Assignee: Ford Motor Company, Dearborn, Mich.

[21] Appl. No.: 523,304

[22] Filed: May 14, 1990

Related U.S. Application Data

[63] Continuation of Ser. No. 61,762, Jun. 15, 1987, abandoned.

[51] Int. Cl.⁵ .................. B29C 33/10; B29C 45/14
[52] U.S. Cl. .................... 425/468; 425/543; 425/544; 249/61; 249/63; 249/83; 249/175; 249/177; 264/257; 264/317; 428/131; 428/137; 428/68; 428/76
[58] Field of Search ............ 428/131, 134, 136, 137, 428/68, 76, 313.9, 325, 319.1; 425/543, 544, 468; 249/61, 63, 83, 175, 177; 264/257, 258, 317

[56] References Cited

U.S. PATENT DOCUMENTS

| | | | |
|---|---|---|---|
| 3,233,310 | 2/1966 | Corl | 264/313 |
| 3,459,628 | 8/1969 | Dixon | 428/319.1 |
| 3,478,134 | 11/1969 | Gruss | 264/45.7 |
| 3,503,825 | 3/1970 | Moore | 264/46.9 |
| 3,562,985 | 2/1971 | Nicosia | 428/319.1 |
| 3,708,563 | 1/1973 | Sell | 264/46.9 |
| 3,832,264 | 8/1974 | Barnette | 264/273 |
| 3,887,750 | 6/1975 | Duckett | 264/46.5 |
| 3,925,528 | 12/1975 | Muller | 264/54 |
| 3,939,509 | 2/1976 | Moore | 264/46.9 |
| 4,032,683 | 6/1977 | Coale | 264/DIG. 6 |
| 4,218,415 | 8/1980 | Biscaro | 264/46.9 |
| 4,246,212 | 1/1981 | Upmeier et al. | 264/40.1 |
| 4,344,142 | 8/1982 | Diehr, II et al. | 264/40.1 |
| 4,468,363 | 8/1984 | Miessler | 264/DIG. 6 |
| 4,551,289 | 11/1985 | Schwab et al. | 264/40.1 |
| 4,556,438 | 12/1985 | Hoffmeister | 264/46.9 |
| 4,560,523 | 12/1985 | Plumley et al. | 264/250 |
| 4,650,626 | 3/1987 | Kurokawa | 264/276 |
| 4,676,041 | 6/1987 | Ford | 428/317.7 |

Primary Examiner—Jay H. Woo
Assistant Examiner—Jeremiah F. Durkin, II
Attorney, Agent, or Firm—Damian Porcari; Roger L. May

[57] ABSTRACT

A resin transfer molding core has an outer surface and internal communication passages. One internal communication passage has an inlet opening and at least one discharge opening extending through the outer surface of the core. At least a second internal communication passage has a discharge opening extending through the outer surface of the core and at least one inlet opening. A preform comprises the core with fiber reinforcement material on the outer surface.

14 Claims, 1 Drawing Sheet

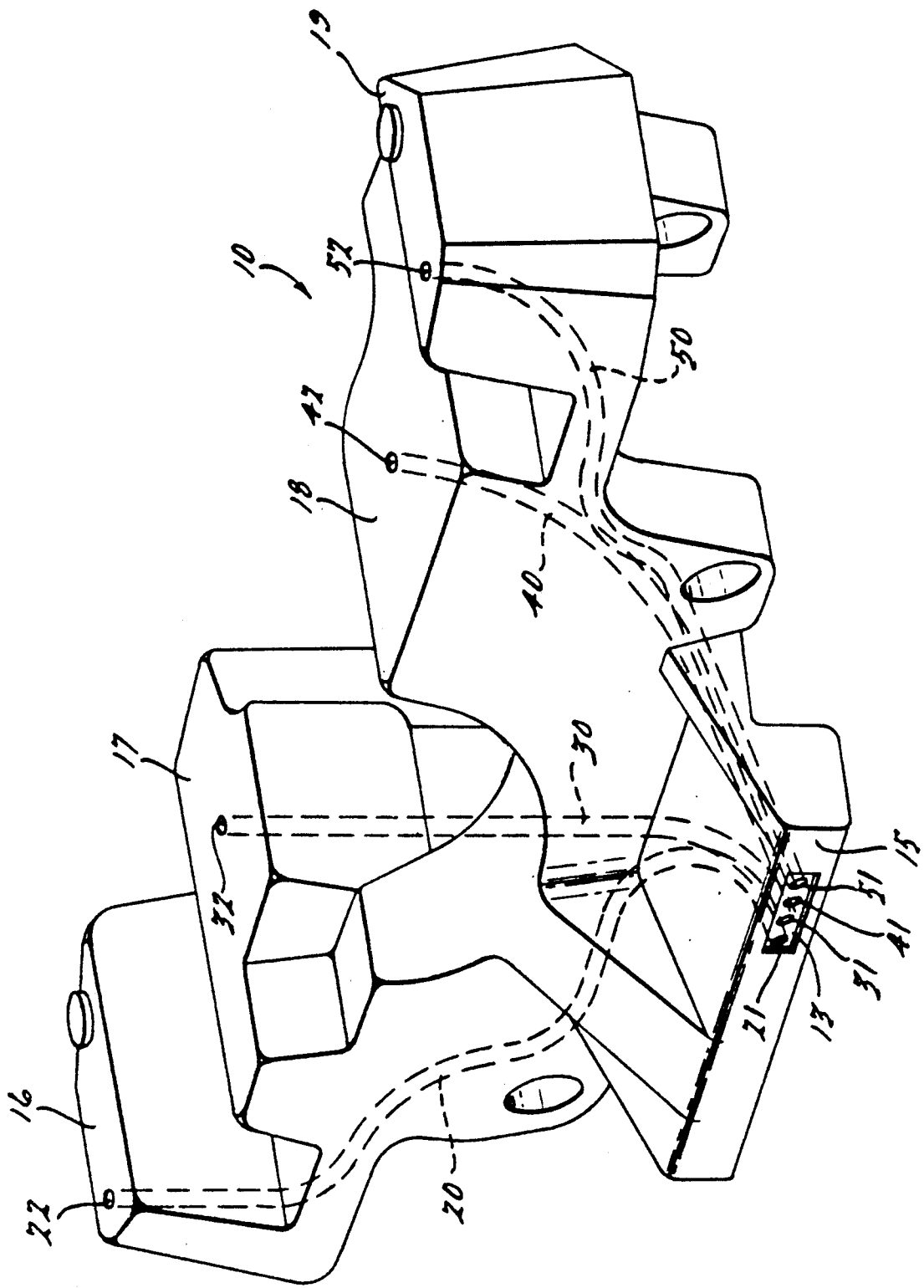

RESIN TRANSFER MOLDING CORE AND PREFORM

This application is a continuation of application Ser. No. 07/061,762, filed June 15, 1987, now abandoned.

RESIN TRANSFER MOLDING CORE AND PREFORM

Introduction

This invention is directed to resin transfer molding ("RTM") and, more specifically, to an RTM preform, to a core for such preform, and to an RTM process employing same.

Resin transfer molding is a closed mold, low pressure process applicable to the fabrication of complex, high performance composite articles of both large and small size. Several different resin transfer molding processes are well known to the skilled of the art. The process is differentiated from various other molding processes in that reinforcement material, such as fiberglass or other fiber reinforcement material, is placed separately into a molding tool cavity and then combined with resin within the mold cavity to form a fiber reinforced plastic ("FRP") composite product. Typically, a pre-shaped fiber reinforcement is positioned within a molding tool cavity and the molding tool is then closed. A feed line connects the closed molding tool cavity with a supply of liquid resin and the resin is pumped or "transferred" into the tool cavity where it impregnates and envelops the fiber reinforcement and subsequently cures. The cured or semi-cured FRP product then is removed from the molding tool cavity. It should be understood that as used herein, the term resin transfer molding and RTM refer to any molding process wherein a fiber reinforcement material or structure is positioned within a mold into which resin is subsequently introduced. Thus, variations such as so-called press molding or squeeze molding and the like are within the scope of such terms. Another variant of resin transfer molding, often referred to as structural reaction injection molding, uses a highly reactive resin system comprising two components pumped from separate holding tanks under relatively high pressure into an impingement mixing chamber, and from there directly into the molding tool cavity. The tooling typically comprises a metallic shell to facilitate heat transfer. Although the mixing pressure is high, the overall pressure of the resin in the molding tool typically is only about 50–100 psi. The resin flows into the molding tool cavity and wets-out the fiber reinforcement as the curing reaction is occurring. Typically, the fiber reinforcement material can be used in amounts up to about 20–30 weight percent of the fiber plus resin composite. Due to the rapid resin cure, flow distances are limited and for longer flow distances multiple inlet ports may be required. Another variant of resin transfer molding, referred to generally as high speed resin transfer molding, is particularly suitable for commercial production of products requiring a 3-dimensional preform comprising a core, with attachment inserts, etc. as required, and fiber reinforcement material over all or selected portions of the surface of the core. Fiber content typically is in the 35–50 weight percent range and may be a mixture of both continuous fiber (random and/or oriented) and chopped random material. Tooling for high production volumes typically comprises steel in order to contain moderate molding pressures of 100–500 psi and for good heat transfer characteristics. For more limited production requirements, aluminum or zinc tooling may be acceptable. Typically, molding is carried out at elevated temperatures to reduce the cure time. The preform is positioned within the mold, the mold is closed and resin is injected. At higher reinforcement levels, that is, at higher fiber weight content, the mold may be left slightly opened during resin injection to promote more rapid filling of the molding cavity; the mold cavity would then be fully closed. Preferably, the curing of the resin is accomplished in the mold such that the product will require no post-bake cycle and will have an acceptable dimensional stability. For complex components or components having critical tolerance requirements, a fixtured post-cure may be required for adequate dimensional stability. Typically, cycle times range from about 1 minute to about 4 minutes for small components and from about 8 minutes to about 12 minutes or longer for large, complex structures.

In view of the fact that RTM processes allow placement of fiber reinforcement materials, containing any of the various available fiber types or combinations thereof, in the mold cavity with minimal subsequent movement of the reinforcement during injection of the resin, the fiber reinforcement can be designed for optimum performance at minimum weight. That is, the fiber reinforcement can be designed and assembled with the most appropriate fiber type (glass, graphite, aramid, etc.), either chopped or continuous, random or oriented, in each of the various different portions of the reinforcement structure. Again, this yields a product of more optimum performance at reduced weight. Also, the low pressure required for the low resin injection pressures which are used allows the use of less expensive presses and the use of tooling somewhat less costly than that employed in high volume compression molding or thermoplastic stamping processes. Furthermore, there is the opportunity for significant tooling expense reduction, when compared to steel components for example, where a significant degree of sub-part integration is achieved. In addition, the low pressures employed in RTM processes enables much larger structures to be molded, since current compression molding processes are limited by the availability of sufficiently large presses.

A significant advantage of the RTM processes is the ability to incorporate cores and inserts into the product design. That is, in addition to the fiber reinforcement material, hollow cores or foam cores, for example, so-called structural foam cores, or the like can be incorporated into a fiber reinforcement preform which is positioned within the mold cavity prior to introducing the resin. Typically, the fiber reinforcement is wound onto the core or otherwise attached to the surface thereof. As used herein, the term preform refers to a reinforcement structure which is adapted to be placed in an RTM molding tool cavity and which comprises a core, in one or more segments, and fiber reinforcement material on the outer surface of the core. Inserts, such as metal devices to serve as attachment means for assembly of the FRP product with other structures, and a wide variety of other devices can be incorporated into the preform. The incorporation of cores, including, for example, structural and semi-structural foam cores and removable cores, enables a great deal of control over the strength, weight and other physical properties of the FRP product. It enables the fabrication of 3-dimensional structures with, for example, deep sections discontinuous contours and other configuration complexities.

Considerable effort is now being made to further advance the technology of RTM processes. Specifically, development is on-going in the areas of tooling fabrication, resin chemistry, control of resin flow and cure rates and fabrication of complex preforms and the cores for same. Fabrication of the preform is an area most critical to the successful implementation of an RTM process in the production of any given product, and especially in the case of a product having a complex surface geometry. Design and development of an optimized preform and of a process to fabricate same must take into account and utilize the physical characteristics of the various available composite materials. With respect to the fibrous reinforcement material, chopped, random E-glass fiber material may be employed, where suitable, in view of its low cost and ease of use. Such random fiber reinforcement material is available in the form of flat sheets or mats which can be cut and formed to fit, as needed, onto the surface of the core. Several layers of mat can be overlapped to provide greater depth of material where needed. Typically, the several layers are stitched together either prior to or at the time of attachment to the core. For some applications, it will be required to employ flat sheets or mats of random glass which have been pre-shaped prior to attachment to the core. Such mats comprise not only the random glass but also small amounts of binder resin, either thermoset or, more typically, thermoplastic binder resin. The binder allows the sheet to retain the desired shape when heated and pressed in a suitable forming die, without the cutting and piercing required for non-resinated mats. Small amounts of continuous reinforcement fibers are in some cases included in the mat to improve the physical properties, where required. Presently, however, this process cannot easily produce radical 3-dimensional shapes, such as deep concavities.

The most versatile technique for creating 3-dimensional RTM preforms of complex shape is the so-called spray-up process, wherein chopped glass rovings are sprayed onto a screen. A small amount of resin is introduced into the stream of chopped glass to cause it to be retained on the screen. When the fibers accumulate to the proper weight or depth, the resin is cured, causing the resultant Preform to retain its shape. Typically, vacuum is applied to the back side of the screen to hold the glass onto the screen as it accumulates and also to help ensure uniformity of fiber depth in the various areas of the screen. As the holes in the screen become covered by glass, the remaining open areas tend to attract more glass, causing a self-leveling action. This process, while capable of producing preforms of complex shape, is suitable generally to produce only products of moderate to low physical properties (i.e., strength, etc.). Not only does the binder resin sprayed with the chopped reinforcement tend to seal off the fiber bundles, resulting in incomplete resin impregnation of the p reform during the molding process, but in addition, chopped random reinforcement is at the lower end of structural composite performance. Products requiring greater strength generally require the use of oriented continuous fiber reinforcement material, at least in selected areas.

There are currently several techniques for making preforms containing oriented materials. Oriented materials, generally comprising continuous glass roving, can be attached to the surface of a core or preform. A typical oriented reinforcement material, oriented glass fiber fabric, may be in the form of woven, knitted or braided fabric or may comprise simply uniaxial bundles of fibers, referred to as roving, arranged in parallel, optionally with multiple layers oriented at an angle to one another. That is, such sheets may comprise either a single layer, all the reinforcement being in the 0° direction, or multiple layers with one layer at some angle to its adjacent layers. These materials are not woven, as in cloth, but rather are stitched together with a thread of polyester, KEVLAR (trademark), or the like. Use of uniaxial rather than woven fiber fabrics often yields improved physical properties and better resin wet-out in the final product.

The structural efficiency of preforms employing oriented fibers is due primarily to the more exact placement and orientation of the reinforcement material where needed. Layers of oriented reinforcement sheets can be stacked and further stitched together into a 3-dimensional structure. Oriented fibers also can be added to an RTM core or preform by known filament winding techniques, wherein the core (or a preform, e.g. a core already having some random and/or oriented reinforcement material) receives continuous fibers unwound from a plurality of spools onto the surface of the core. In one alternative the core is rotated to pull fibers from the source spools. In another alternative the core is held stationary while the fibers are wrapped around it. Similarly, continuous fiber reinforcement material can be woven, braided or knit around the core.

The use of RTM processes has proven problematic in connection with products of complex geometry or surface configuration, particularly with respect to the delivery and distribution of resin to all areas of the surface of the preform. This may be due in part to the length of the path from the point of resin input and/or to the entrapment of air within a molding tool cavity, preventing the flow of resin into the area occupied by the entrapped air. Resin may flow poorly, particularly at low resin filled pressures, into remote surface areas of the RTM preform within the molding tool cavity. It has been suggested to form shallow depressions in the surface of the preform to act as channels in which resin can flow more easily to such remote areas of the preform, such as is done in the FRP boat hull construction industry. This approach is generally unsuitable, however, where more uniform surface strength, appearance, etc. is required, since the resin channels so formed result in resin-rich areas in the finished product. In addition, such channels generally cannot be maintained resin-free during an early stage of introducing resin into the molding cavity and, hence, do not provide a channel for evacuation of entrapped air. A channel in the outer surface of the core is also unsuitable in that the resulting resin-rich areas are found to be prone to cracking and other failure modes.

Accordingly, it is an object of the present invention to provide a resin transfer molding core and a preform comprising same, wherein resin can be provided to all surface areas of the preform, even in the case of products of complex geometry or surface configuration. More specifically, it is an object of the present invention to provide an RTM core and preform which facilitates controlled resin delivery to, and air evacuation from, all surface areas of the preform during the molding process. It is a further object of the present invention to provide an RTM process employing such core and preform.

Additional objects and advantages of the present invention will be understood from the drawings and the following description.

SUMMARY OF THE INVENTION

According to a first aspect of the invention, a method is provided for resin transfer molding a fiber reinforced plastic composite structure, which method comprises:

(A) providing a resin transfer molding core having an outer surface and comprising a plurality of internal communication passages within the core, at least a first of such internal communication passages having an inlet opening and at least one discharge opening extending through the outer surface of the core, and at least a second of such internal communication passages having a discharge opening extending through the outer surface of the core and at least one inlet opening;

(B) affixing fiber reinforcement material to the outer surface of the core to form a resin transfer molding preform;

(C) positioning the preform in a cavity of a molding tool having a first port and a second port;

(D) closing the molding tool and forming a fluid-tight communication between the first port and the aforesaid inlet opening of the first internal communication passage and also forming a fluid-tight communication between the second port and the aforesaid discharge opening of the second internal communication passage;

(E) introducing uncured resin into the cavity of the molding tool through such first port, to and through the inlet opening of the first internal communication passage, and venting the cavity through the discharge opening of the second internal communication passage, to and through second port; and (F) curing the resin to provide the desired FRP composite product or structure.

According to another aspect of the invention, a core for a resin transfer molding preform is provided. The core has an outer surface and comprises a plurality of internal communication passages within its interior space. At least a first such internal communication passage has an inlet opening and at least one discharge opening extending through the outer surface of the core. At least a second internal communication passage has a discharge opening extending through the outer surface of the core and at least one inlet opening.

According to another aspect of the invention, a preform for a resin transfer molding process is provided. Such preform comprises a core as described above and fiber reinforcement material affixed to the outer surface of the core.

DESCRIPTION OF THE DRAWING

Additional objects, features and advantages of the invention will become more apparent from the following description taken in conjunction with the accompanying drawing, which is a perspective view of an RTM core or preform according to the present invention.

DETAILED DESCRIPTION OF THE INVENTION

Referring now to the drawing, a resin transfer molding core 10 is shown. This also represents an RTM preform if the surface is taken as comprising fiber reinforcement material attached to the surface of such core. For convenience in the following discussion, reference will be made to item 10 as a preform, the fiber reinforcement material on the surface thereof not being separately illustrated. The skilled of the art will understand this to illustrate also an RTM core according to the invention. Preform 10 is seen to have a complex shape and surface configuration. This shape/configuration, chosen to illustrate the present invention and not intended as a limitation thereof, closely approximates the shape/configuration of a motor vehicle front end cross member, a structural component used in the frame/body structure of certain motor vehicles. It will be understood that the present invention and the advantages thereof are not specific to any particular part or part configuration or geometry but, rather, are general to FRP composite structures produced through a resin transfer molding process.

The preform 10 is seen to comprise several channels extending from port area 13 in surface 15 of the preform. Port area 13 is seen to comprise an inlet opening or outlet opening of several internal communication passages extending through the interior of the preform from the port area to remote locations at the surface of the preform. Specifically, internal passage 20 is seen to have inlet opening 21 at port area 13 and outlet 22 in surface 16 of the preform. Internal passage 30 is seen to have outlet 31 at port area 13 and inlet 32 in surface 17 of the preform. Internal passage 40 is seen to have outlet 41 at port area 13 and inlet 42 in surface 18 of the preform. Internal passage 50 is seen to have inlet 51 at port area 13 and outlet 52 in surface 19 of the preform.

In a resin transfer molding operation, the RTM preform of the invention described in the drawing would be employed to advantage in the following manner. The preform would be positioned within the cavity of an RTM molding tool and the mold would be closed around it. The molding tool would provide a first port(s) forming a fluid-tight (resin-tight) communication with the inlet opening(s) of each resin-in passage of the preform, these being passages 20 and 50 in the embodiment described above. Passages 20 and 50 are referred to as "resin-in" passages in that resin is introduced into the molding tool cavity through these passages. The molding tool would provide second port(s) forming fluid-tight communication with the discharge (i.e., outlet) opening of the air-out passages of the preform, these being passages 30 and 40 of the above-described embodiment. Passages 30 and 40 are "air-out" passages in that they are used to vent air from within the molding tool cavity. Within the scope of the invention they may simply be open to the atmosphere or, in the alternative, a vacuum may be drawn in the molding tool cavity through the air-out passages. Generally, it will be preferred to locate the inlet openings of the resin-in passages and the outlet openings of the air-out passages in close proximity to one another so as to have a single port area in the molding tool through which the resin-fill operation takes place. As noted above, resin is introduced into the molding cavity through passages 20 and 50 and air is evacuated therefrom through passages 30 and 40. These two functions are preformed generally in any sequence found suitable to the operation although, generally, it will be necessary that air is evacuated from the cavity either prior to or simultaneous with resin introduction. It will be apparent that the number and placement of the resin-in and air-out passages will be a matter within the ability of those skilled in the art of resin transfer molding given the present disclosure. In general, this will depend on the particular geometry and surface configuration of the part being produced, on the desired resin-fill time and on the nature of the materials used, especially the viscosity, etc. of the resin.

According to one preferred embodiment of the invention, air or other suitable gas is used to purge the resin-in passages, that is, to evacuate them or nearly evacuate them of resin at the end of the resin injection operation. Such purging easily can be calculated to result in the needed amount of resin reaching the surface of the preform. Since resin is not left in the internal resin passages, there is a commensurate savings in weight and cost in the final product. It may be necessary or preferable to apply back pressure into the air-out passages to prevent resin from flowing or being drawn into the inlet end thereof. Of course, it will be apparent that such back pressure into the air-out passages will preferably occur only after some resin has entered the inlet end thereof to prevent blowing resin away from the surface of the preform at the inlet end of the air-out passages. In this regard, it is a particularly preferred embodiment of the invention that sensing means be employed to sense the presence of resin at a location within the air-out passages. Such sensing can be by means of temperature sensing, since the resin generally will be at a higher temperature than the air being evacuated from the molding tool cavity. Alternatively, a photoelectric eye or other visual sensing means can be employed according to commercially available means. Other suitable sensing means will be apparent to the skilled of the art in view of the present disclosure. Thus, once resin has been sensed at a suitable location within the air-out passages, back pressure can be applied without risk of injecting gaseous fluid into the surface area of the preform. According to a most particular preferred embodiment, an air-out passage is used first to apply vacuum and then switched to apply back pressure in the air-out passages, this switch being computer controlled according to a pre-determined protocol based on the aforesaid sensing of resin within the passages. The computer control of the switching and back filling of resin to air-out passages could be based not only on resin sensed within the tube but also on back pressure, resin flow rate and/or other process parameters and conditions. Alternatively, the switch from applied vacuum to applied back pressure can be determined by trial and error techniques for each specific part design Such sensing means also can be used in the same way to determine the proper amount of purging gas to be used in the resin-in passages.

According to a preferred alternative embodiment of the invention, one or more air-out passages of the preform are used to introduce resin into the molding tool cavity following use thereof to evacuate air from the cavity. Thus, for example, an air-out passage could be allowed to back fill with resin from the surface of the prototype all the way to the discharge opening of such passage (where it forms the aforesaid fluid-tight communication with a port of the molding tool). At this point flow can be reversed within the tube such that resin is introduced into the cavity therethrough, with little or no air bubble in the line. Of course, such air-out passage could thereafter be evacuated of resin by purging it with air or other suitable gas, as described above for the resin-in passages.

Following the resin injection operation, the uncured resin is solidified or partially solidified through cooling (in the case of a thermoplastic) or through curing (in the case of a thermoset plastic). The resulting FRP composite structure then is removed from the molding tool cavity and the process can be repeated to produce additional parts. After the cured part is removed from the molding tool cavity, it may be desirable according to the design of certain parts to remove portions of the core therefrom. It will be within the ability of those skilled in the art, in view of the present disclosure, or fashion internal communication passages suitable for use in RTM preforms comprising removable core portions. Thus, for example, one could readily fashion internal communication passages which are detachable at the parting line between a removable core portion and that portion of the core (and internal communication passage) which remains in the molded product. Further regarding removal of core portions after curing of an FRP part, it will be apparent to the skilled of the art that the present invention is compatible with and encompasses so-called "lost core" molding methods, wherein the core comprises wax, fusible metal, resinated sand or the like or other material which can be melted or dissolved out from within the FRP part following cure of the resin. In this case the internal communication passages of the core could be formed simply in such meltable/dissolvable/etc. material, as described above for foam cores. Alternatively, the tubes could formed of material which is similarly meltable/dissolvable/etc. or could simply be left within the interior of the finished FRP composite structure.

Suitable cores according to the present invention can comprise any of the numerous core materials known to those skilled in the art and may include, for example, any of the various cores mentioned above. Thus, for example, structural and semi-structural foam can be molded in a suitable molding tool to form a core having the desired configuration. While the selection of suitable foam material will depend largely on the application for which the core and the ultimate product are intended, generally preferred in view of its favorable costs and good physical properties are any of the numerous commercially available polyurethane foams. It will be understood, however, that suitable cores also can comprise any of numerous alternative materials. Thus, for example, a suitable core may comprise a formed metal or plastic sheet or screen having the desired configuration. In appropriate applications one or more segments or the entire core may be removable from the product following the molding processing. Thus, for example, where it is desired to render a certain portion of the product more readily crushable (i.e., less strong in the sense of being more readily crushable) than another portion of the product, the core from the former portion of the product may be removed. Suitable cores also include pressurized bladders, which optionally are deflatable and removable, and other types of mandrels, the primary consideration being that it act as a support for the fibrous reinforcement material during the resin transfer molding process. Additionally, as used herein, it will be understood that the core onto which the continuous oriented fibers are wound, wrapped, woven, knitted, etc. may already comprise fibrous reinforcement material, either in the same section being overwrapped with the continuous oriented fibers and/or in different sections thereof.

Suitable fibrous reinforcement materials have been described above and include, for example, numerous materials known to the skilled of the art, among which are such commercially available materials as E glass fibers, S glass fibers, graphite fibers, aramid fibers (including KEVLAR (trademark)) and the like. For use in the preforms and in the preform cores of the present invention, such fibrous reinforcement material can be used in any of various configurations including, for example, random chopped fiber, continuous random fiber, and oriented continuous fiber, for example, nonwoven, woven, knitted, braided, etc. As discussed above, chopped fiber can be used either in the form of a mat or can be blown onto a screen to which it is held, optionally, with the aid of a vacuum.

Resins suitable for RTM processes are well known to the skilled of the art and include many commercially available resins. Suitable resins have been discussed above and include both thermosetting plastic and, more typically, thermosetting resins. Most common are the epoxy and polyester resins in view of their strength and performance characteristics and relatively favorable cost and availability. Additional suitable resins for use in the present invention will be apparent to the skilled of the art in view of the present disclosure.

The internal communication passages can be formed within the core/preform in any of various suitable ways. Where the core comprises structural or semi-structural foam, for example polyurethane foam, the passages can be formed by the foam itself such as by means of retractable slides or mandrels positioned prior to the foaming process. Alternatively, the passages can comprise tubing such as, for example, flexible plastic tubing, metal tubing, or the like. In general, it is necessary that the passage comprise a material sufficient durable and resin-resistant to avoid rupture or dislocation during the resin-fill and air evacuation operations. With each of the above-mentioned passage types, it will be apparent to the skilled of the art how the passage may be branched to have multiple outlets (in the case of the resin-in passages) or multiple inlets (in the case of air-out passages).

While the invention has been described in detail with respect to certain presently preferred features and embodiments, it will be understood by those skilled in the art in view of the present disclosure that various changes and modifications may be made without departing from the scope of the invention. Accordingly, the claims appended hereto are intended to cover all such changes and modifications.

I claim:

1. A resin transfer molding core comprising a substantially solid body of polyurethane foam having an outer surface and a plurality of internal communication passages formed by flexible plastic tubes embedded within said core, at least a first of said internal communication passages having an inlet opening at a resin injection port area in the outer surface of said core and at least one discharge opening extending through the outer surface of said core, and at least a second of said internal communication passages having an inlet opening at said resin injection port area and having at least one discharge opening extending through the outer surface of said core.

2. A resin transfer molding preform for a resin transfer molding process comprising:
a core comprising a substantially solid body of polyurethane foam having an outer surface and a plurality of internal communication passages formed by flexible plastic tubes embedded within said core, at least a first of said internal communication passages having an inlet opening at a resin injection port area in the outer surface of said core and at least one discharge opening extending through the outer surface of said core, and at least a second of said internal communication passages having an inlet opening at said resin injection port area and having at least one discharge opening extending through the outer surface of said core; and
fiber reinforcement material affixed to said outer surface of said core.

3. A resin transfer molding core having an outer surface and comprising a plurality of internal communication passages formed by tubes embedded within the core, at least a first of said internal communication passages having an inlet opening and at least one discharge opening extending through the outer surface of said core, and at least a second of said internal communication passages having a discharge opening extending through the outer surface of the core and at least one inlet opening.

4. The resin transfer molding core of claim 3, wherein said core comprises a substantially solid body of foam.

5. The resin transfer molding core of claim 4, wherein said foam is structural polyurethane foam.

6. The resin transfer molding core of claim 3, wherein said tubes comprise flexible plastic.

7. A resin transfer molding preform for a resin transfer molding process, said preform comprising:
a core having an outer surface and comprising a plurality of internal communication passages within said core, at least a first of said internal communication passages formed by tubes embedded having an inlet opening and at least one discharge opening extending through the outer surface of said core, and at least a second of said internal communication passages having a discharge opening extending through said outer surface of the core and at least one inlet opening; and
fiber reinforcement material affixed to said outer surface of said core.

8. A resin transfer molding core having an outer surface and comprising a plurality of internal communication passages formed by tubes embedded within the core, at least a first of said internal communication passages having an inlet opening at a resin injection port area in the outer surface of said core and at least a second of said internal communication passages having an inlet opening at said resin injection port area and having at least one discharge opening extending through the outer surface of said core.

9. The resin transfer molding core of claim 8 wherein said core comprises a substantially solid body of foam.

10. The resin transfer molding core of claim 8 wherein said tubes comprise flexible plastic.

11. A resin transfer molding preform for a resin transfer molding process, said preform comprising:
a core having an outer surface and comprising a plurality of internal communication passages within said core, at least a first of said internal communication passages having an inlet opening at a resin injection port area in the outer surface of said core and at least one discharge opening extending through the outer surface of said core, and at least a second of said internal communication passages having an inlet opening at said resin injection port area and having a discharge opening extending through said outer surface of said core; and
fiber reinforcement material affixed to said outer surface of said core.

12. The resin transfer molding preform of claim 11 wherein said resin injection port area is recessed from an immediately adjacent portion of said outer surface of said core.

13. A resin transfer molding core comprising a substantially solid body of polyurethane foam having an outer surface and comprising a plurality of internal communication passages formed by flexible plastic tubes embedded within the core, at least a first of said internal communication passages having an inlet opening and at least one discharge opening extending through the outer surface of said core, and at least a second of said internal communication passages having a discharge opening extending through the outer surface of the core and at least one inlet opening.

14. A resin transfer molding preform for a resin transfer molding process, said preform comprising:
   a core comprising a substantially solid body of foam having an outer surface and comprising a plurality of internal communication passages formed by flexible plastic tubes embedded within said core, at least a first of said internal communication passages having an inlet opening and at least one discharge opening extending through the outer surface of said core, and at least a second of said internal communication passages having a discharge opening extending through said outer surface of the core and at least one inlet opening; and
   fiber reinforcement material affixed to said outer surface of said core.

* * * * *